United States Patent [19]

Hougen

[11] 4,261,673
[45] Apr. 14, 1981

[54] MAGNETIC BASE DRILL

[76] Inventor: Everett D. Hougen, G-5072 Corunna Rd., Flint, Mich. 48504

[21] Appl. No.: 27,521

[22] Filed: Apr. 5, 1979

[51] Int. Cl.³ .................... B23B 39/14; B23B 45/14
[52] U.S. Cl. .................................. 408/5; 408/76; 408/135; 408/710; 409/178
[58] Field of Search ............... 408/4, 5, 76, 108, 111, 408/135, 710, 712; 409/178, 182; 51/241 S

[56] References Cited

U.S. PATENT DOCUMENTS

| 2,622,457 | 12/1952 | Buck | 408/76 |
| 2,818,655 | 1/1958 | DeGaston | 408/76 X |
| 2,977,825 | 4/1961 | Buck | 408/76 |
| 3,969,036 | 7/1976 | Hougen | 408/76 |

FOREIGN PATENT DOCUMENTS 542787  1/1942  United Kingdom ............ 408/76

*Primary Examiner*—Z. R. Bilinsky

*Attorney, Agent, or Firm*—Barnes, Kisselle, Raisch & Choate

[57] ABSTRACT

A magnet base drill unit having a finger thereon frictionally engaging the surface of the workpiece to which the base of the drill unit is magnetically adherred. The finger is movable in response to lifting or sliding of the energized magnet base from the support base of the workpiece to actuate a switch for de-energizing the drill motor. The unit also includes a pointed punch adjacent the rear end of the magnet base which can be in one form of the invention impacted into the workpiece support surface either by a manually operated lever or automatically whenever the drill spindle is retracted from the work to a position near the upper end of its stroke. A second punch may be located on the drill unit rearwardly of the automatically actuated punch. The second punch is arranged to be embedded into the support surface of the workpiece by a manually applied hammer blow.

43 Claims, 12 Drawing Figures

MAGNETIC BASE DRILL

This invention relates to a magnet base drill unit.

A magnet base drill unit designed for cutting relatively large holes in metal workpieces must, of necessity, employ a motor capable of exerting a relatively high torque without stalling. While magnets used on such drill units are frequently capable of resisting the direct pull normally encountered as a result of the downward feed force on the drill spindle, they frequently do not have sufficient strength to resist the torque of the motor. If the drill or cutter binds in the hole being cut and the motor does not stall, the whole drill unit will slide or spin on the workpiece surface to which the base is magnetically adherred. This action can be very dangerous and can result in personal injury to the operator.

A primary object of this invention is to provide a safety device for immediately stopping the drill motor in the event that the magnet base tends to slide, lift or rock on the workpiece surface to which it is magnetically adherred.

Another object of this invention is to provide a means for increasing substantially the torque which a magnet base drill unit is capable of resisting.

More specifically, the invention contemplates a drill unit having an electromagnet base and also having a switch actuating mechanism provided with a finger adapted to frictionally engage the support surface to which the drill unit is magnetically adherred. The work contacting finger is movable in response to sliding or lifting of the magnet base relative to the workpiece support surface to actuate a switch which de-energizes the drill motor. The drill unit also includes a punch at the rear end of the magnet base which, in one form of the invention is designed to automatically impact against and indent into the workpiece surface in response to retraction of the spindle upwardly to a position near the upper end of its stroke. The punch is biased to remain in engagement with the identation in the workpiece and, since it is located remotely from the drill spindle, it serves to substantially increase the torque which the electromagnet would otherwise be capable of resisting.

A further object of this invention is to maximize the resistance of the drill unit to torque by the provision of a second punch spaced even further rearwardly from the rear end of the magnet base. The second punch projects below the flat bottom surface of the magnet base and is adapted to be struck with a hammer blow to embed the pointed lower end of the punch in the workpiece support surface.

Other objects, features and advantages of the present invention will become apparent from the following description and accompanying drawings, in which.

Figure 1:
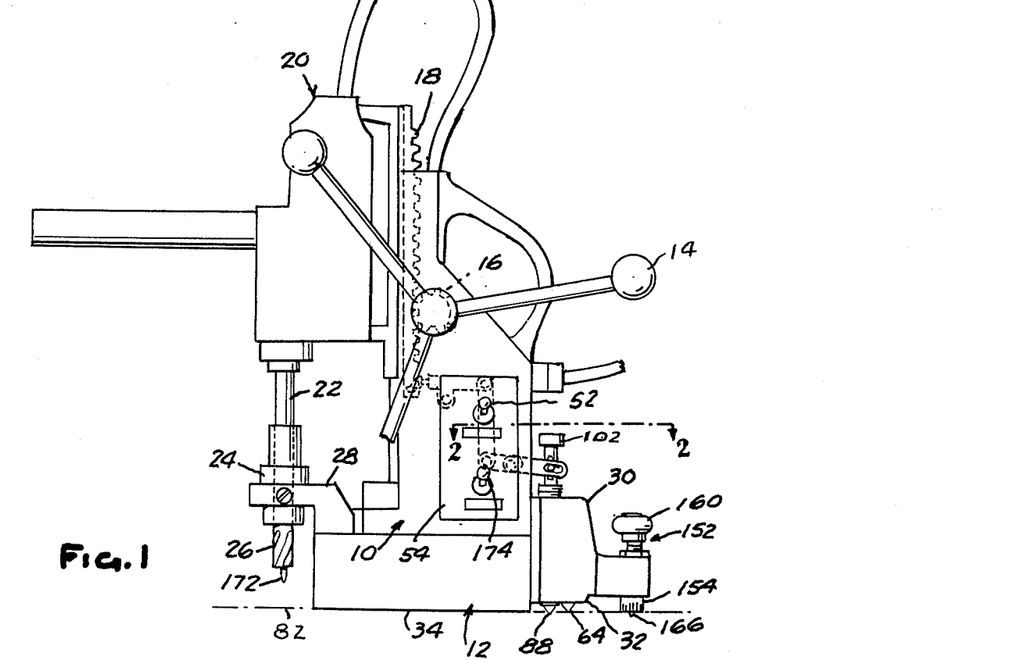
FIG. 1 is a side elevational view of a magnet base drill unit embodying the present invention.

Referring to FIG. 1, the drill unit of the present invention comprises a main body 10 having fixedly mounted thereon an electromagnet base 12. A rotary handle 14 journalled on body 10 rotates a gear 16 meshing with a gear rack 18 guided for vertical movement on body 10. A drill motor 20 is supported on rack 18 and includes a rotary vertical spindle 22 having an arbor assembly 24 mounted thereon for supporting a rotary hole cutter 26. A bracket 28 forms a guide for and stabilizes the arbor assembly 24. The magnet base drill unit thus far described is more or less conventional.

Figure 2:
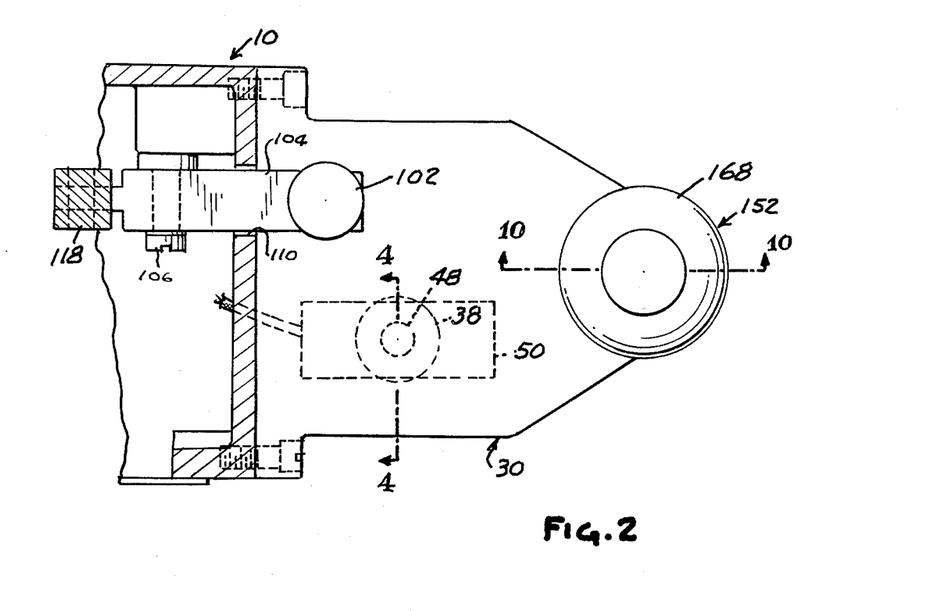
FIG. 2 is a sectional view along the line 2—2 in FIG. 1.

In accordance with the present invention there is fixedly supported at the rear end of magnet base 12 and body 10 a housing 30. The lower end 32 of housing 30 is spaced slightly above the bottom flat face 34 of electromagnet base 12. Within housing 30 and adjacent one side thereof there is provided a cylindrical bore 36 which is open at the lower end 32 of the housing. Within bore 36 there is arranged a vertically slideable plunger 38 which is biased downwardly by a spring 40. The extent of vertical movement of plunger 38 is limited by the end of a stop screw 42 projecting into a vertically extending slot 44 at one side of plunger 38. The upper end of plunger 38 has an upwardly extending stem 46 engaging the movable plunger 48 of a switch 50 within housing 30. Switch 50 is wired in series with the main manually operable motor switch 52 and the drill motor 20. Switch 52 is preferably in the form of a toggle switch mounted on a cover plate 54 at one side of the drill unit body 10.

Figure 3:
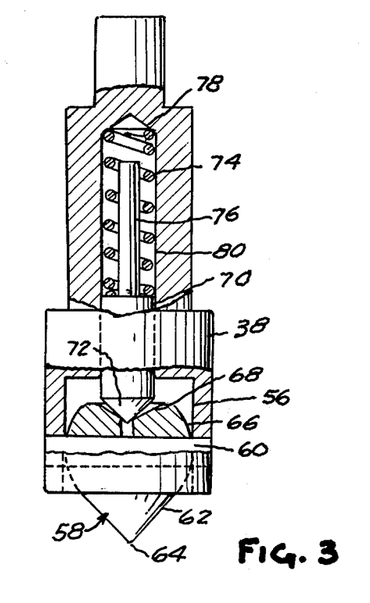
FIG. 3 is a side elevational view, partly in section, of the safety switch actuating mechanism.

The lower end of plunger 38 is formed with a cylindrical cavity 56 in which a finger 58 is pivotally supported as by a pin 60. Pin 60 extends in a fore and aft direction as distinguished from a direction transversely of electromagnet 12. Finger 58 is of circular shape in horizontal section and has a conically shaped lower portion 62 below pin 60 which terminates in a point 64. The portion of finger 58 at and above the pivot pin 60 is spherically shaped as at 66 and has a relatively close fit in the cylindrical cavity 56. Thus, as finger 58 rotates about the axis of pin 60 the spherical portion 66 of the finger remains in close fitting relationship with the cylindrical cavity 56 to prevent the ingress of dirt, grease or the like.

The upper end of finger 58 is formed with a conical recess 68 concentric with its pointed lower end 64. Within plunger 38 there is arranged a pin 70 adapted to slide along the axis of plunger 38. Pin 70 has a conically shaped lower end 72 which is biased downwardly into engagement with the larger conical recess 68 at the upper end of finger 58 by a compression spring 74. A stem 76 of reduced diameter at the upper end of pin 70 is dimensioned in length so that its upper end bottoms against the upper end 78 of the cylindrical bore 80 in which the pin is axially slideable to limit the extent to which finger 58 can pivot in either direction about pin 60. More specifically, as shown in FIG. 5, when the upper end of stem 76 abuts the upper end 78 of bore 80, the lower conical end 72 is still engaged within the conical recess 68 at the upper end of finger 58 and prevents further pivotal movement of finger 58 beyond the position shown in FIG. 5. At the same time it will be appreciated that pin 70 in combination with spring 74 (which is substantially weaker than spring 40) cams finger 58 to the upright position shown in FIG. 4 when pivotal movement of the finger is unrestricted as by lifting the drill unit from the surface 82 of the workpiece on which the electromagnet base 12 is adapted to rest.

Figure 4:
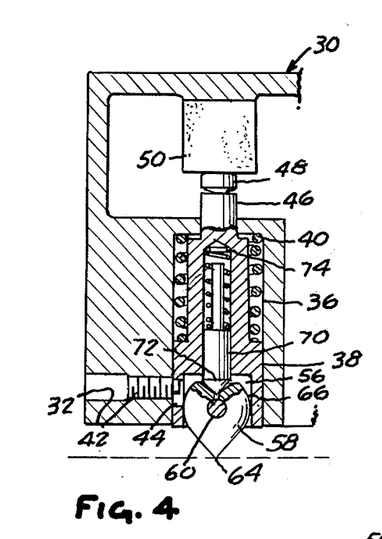
FIG. 4 is a sectional view along the line 4—4 in FIG. 2 showing the switch actuating mechanism in its normal operative position.
Figure 5:
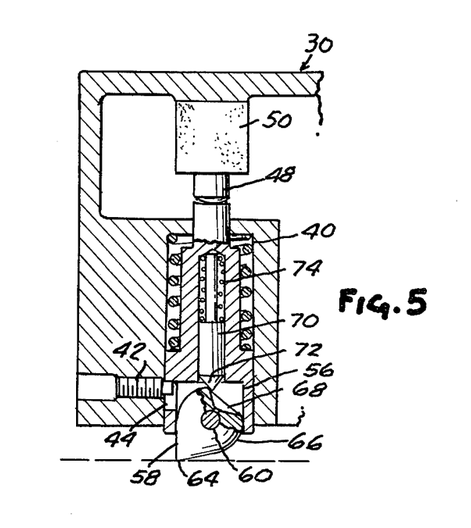
FIG. 5 is a view similar to FIG. 4 showing the switch actuating mechanism in the actuated position.
Figure 6:
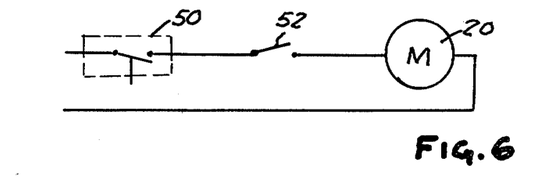
FIG. 6 is a schematic view of a portion of the electrical circuit of the drill unit.

In FIG. 4 finger 58 is shown in its upright position, the upper end of slot 44 being spaced above the end of screw 42. In FIG. 5 finger 58 is illustrated in a tilted position with the upper end of slot 44 abutting downwardly on the end of screw 42.

Figures 7, 8, 9:
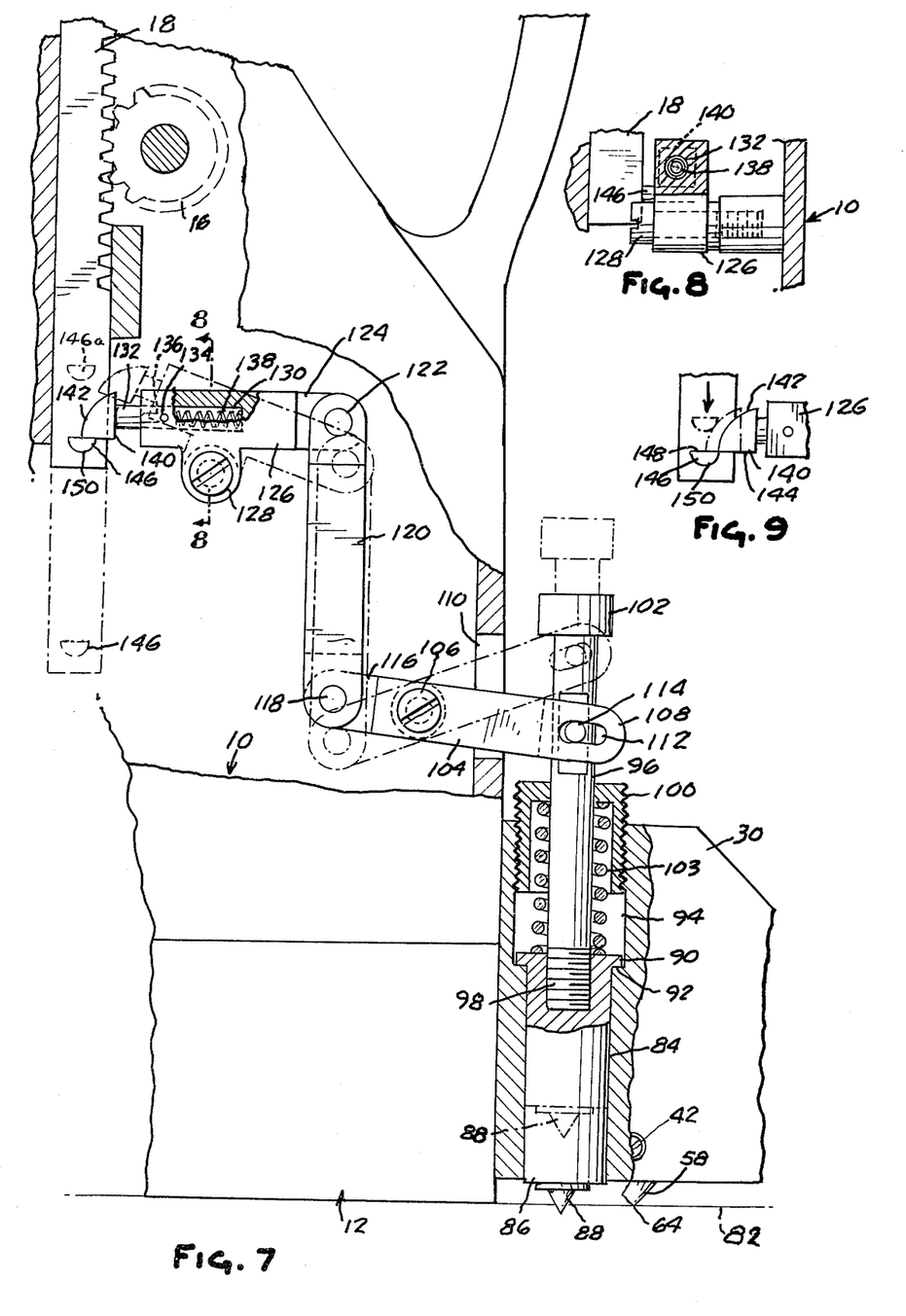
FIG. 7 is a fragmentary side elevational view of the drill unit, partly in section and showing the automatically actuated punch mechanism.
FIG. 8 is a fragmentary sectional view along the line 8—8 in FIG. 7.
FIG. 9 shows a portion of the automatically actuated punch mechanism.

Laterally adjacent the bore 36 housing 30 is formed with a second vertically extending bore 84 in which an impactor plunger 86 is vertically slideable. Plunger 86 has a pointed punch 88 at its lower end and a radially outwardly extending flange 90 at its upper end which limits the extent of downward movement of the plunger by interengagement with the shoulder 92 formed at the lower end of a counterbore 94 concentric with bore 84. A rod 96 is threaded as at 98 into the upper end of impactor plunger 86. Rod 96 extends upwardly above the upper end of housing 30 through a spring retainer 100 threaded downwardly into the housing. The upper end of rod 96 is formed with an enlarged head 102. A heavy compression spring 103 urges plunger 86 and rod 96 downwardly.

A lever 104 is pivotally supported on body 10 as at 106 and has a bifurcated rear end portion 108 projecting outwardly through an opening 110 in body 10. An elongated slot 112 in the bifurcated end portion 108 of lever 104 slideably and pivotally engages a pin 114 on rod 96. The bifurcated front end portion 116 of lever 104 is pivotally connected as by a pin 118 to the lower end of a link 120. The upper bifurcated end of link 120 is pivotally connected as by a pin 122 with the rear end portion 124 of a lever 126 pivotally supported within body 10 as by a screw 128. Lever 126 has an axially extending cylindrical bore 130 opening at the front end of the lever in which a plunger 132 is slideably arranged. A small pin 134 on lever 126 engages an axial slot 136 in plunger 132 to limit the extent of axial sliding movement of plunger 132. Plunger 132 is biased axially forwardly by a spring 138. The forward end of plunger 132 has an enlarged nose 140 with a rounded outer end 142 and a flat bottom face 144. The lower end portion of gear rack 18 has a button 146 fixed thereon. Button 146 has a flat horizontal upper face 148 and a cylindrical lower face 150.

Nose 140 lies in the path of vertical travel of button 146 and is positioned so that the bottom face 144 thereof engages the top face 148 of button 146 as the rack 18 is displaced upwardly to a position near the upper limit of its stroke. When rack 18 is in the fully raised position, button 146 is located in the position designated 146a in broken lines in FIG. 7. At this time nose 140 assumes the position shown in solid lines in FIG. 7.

Figure 10:
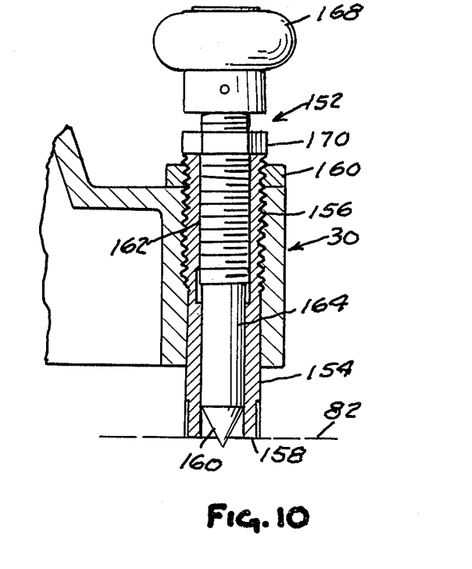
FIG. 10 is a fragmentary sectional view along the line 10—10 in FIG. 2 and showing the arrangement of a second punch at the extreme rear end of the drill unit.

Referring now to FIGS. 1, 2 and 10, a second punch assembly 152 is mounted at the rear end of housing 30. Punch assembly 152 is located at the extreme rear end of housing 30 substantially rearwardly of punch 86. Punch assembly 152 includes a sleeve 154 which is preferably threaded as at 156 in housing 30 for vertical adjustment. The lower end 158 of sleeve 154 is flat and adapted to be adjusted so that it is coplanar with the bottom face 34 of the magnet base 12. Thus, when properly adjusted the lower end 158 of sleeve 154 seats firmly on the surface 82 of the workpiece to which the magnet is adherred. After sleeve 154 is properly adjusted it can be somewhat permanently locked in place by a lock nut 160.

Within sleeve 154 there is threaded as at 162 a punch member 164 having a pointed lower end 166 and an enlarged head 168 fixedly secured to the upper end thereof. The threaded section 162 enables the punch to be adjusted so that its lower pointed end projects a desired distance below the plane of the flat end 158 of sleeve 154. Punch 164 is adapted to be locked in its adjusted position by a lock nut 170.

In use the drill unit shown in FIGS. 1 through 10 is positioned on a workpiece with the motor and magnet de-energized and with the pilot pin 172 within the annular hole cutter 26 located directly above the center of the hole to be cut in the workpiece. The magnet is energized by actuating manual switch 174 on cover plate 154. The enlarged upper end 168 of punch 164 is then struck with a hammer blow to embed the pointed end 166 of the punch into the surface of the workpiece. The drill unit is thus magnetically adherred in a relatively fixed position on the work support surface 82. At this time finger 58 is in the upright position shown in FIG. 4. The upright position of finger 58 can be assured at any time by simply rocking the drill unit upwardly slightly about the front edge of magnet base 12 so that the pointed end 72 of pin 70 becomes fully and concentrically seated in the recess 68 of finger 58. Thereafter, when the drill unit is permitted to seat itself on the work support surface 82, plunger 38 will be displaced upwardly by finger 58 against the bias of spring 40 and thus move plunger 48 of switch 50 to the on position. However, since switch 50 is in series circuit with the main switch 52 of the drill motor, the drill motor will not be energized.

Handle 14 is then rotated clockwise to raise rack 18 and the drill motor 20 attached thereto. When the rack 18 assumes the full line position shown in FIG. 7, button 146 contacts nose 140 on plunger 132 and continued upward movement causes lever 126 to be rotated clockwise. Link 120 causes the lever 104 to be pivoted counterclockwise about the pivot axis 106. The rear end 108 of lever 104 pivots upwardly and displaces rod 96 and impactor plunger 86 upwardly against the bias of spring 103. Before rack 18 reaches the upper end of its stroke, nose 140 will ride off the edge of button 146 and, when this occurs, plunger 86 and punch 88 will be driven downwardly abruptly by the heavy compression spring 103. This will cause the punch 88 to embed itself into the workpiece. Thereafter, when rack 18 is lowered by rotating handle 14 in a counterclockwise direction, the rounded outer face 142 of nose 140 will engage the lower face 150 of button 146 and, thus, displace plunger 132 inwardly of the bore 130 in lever 126 to enable the nose 140 and button 146 to bypass one another as shown in FIG. 9 without pivoting lever 124. If desired, this operation of raising and lowering rack 18 can be performed several times to cause the punch 88 to embed itself a progressively deeper extent in the surface 82 of the workpiece.

The drill unit is then in its proper position and condition for cutting a hole in the workpiece. The drill unit is energized by manually actuating switch 52 and handle 14 is rotated counterclockwise to cause the cutter 26 to engage and penetrate into the workpiece. It will be appreciated that the combination of punch 88 and punch 146, both of which have their lower pointed ends embedded in the workpiece, substantially increases the torque which the magnet 12 is capable of resisting. However, if, for some reason, the cutter should bind or the torque should otherwise become sufficiently excessive to cause the magnet base to slide laterally in either direction on the surface 82 of the workpiece about the axis of the cutter 26 as a center, finger 58 will be immediately pivoted from the position shown in FIG. 4 to the position shown in FIG. 5 or to the oppositely tilted position. When finger 58 pivots or rocks about the pointed end 64, the pivot pin 60 is immediately depressed by compression sprng 40 acting on plunger 38. Thus, the plunger 38 shifts downwardly and the movable contact 48 is actuated to open switch 50 and, thus, immediately deenergize the drill motor 20. It will be appreciated that if the downward feed force on the cutter 26 becomes so excessive as to rock the whole drill unit upwardly about the punch 164, this also will cause plunger 38 to be shifted downwardly under the bias of spring 40 to actuate switch 50 to the off position. Thus, regardless of whether the drill unit rocks on the work surface or slides over the work surface about the axis of the cutter as the center, the drill motor will be instantly de-energized and, thus, avoid any possible injury.

Figure 11:
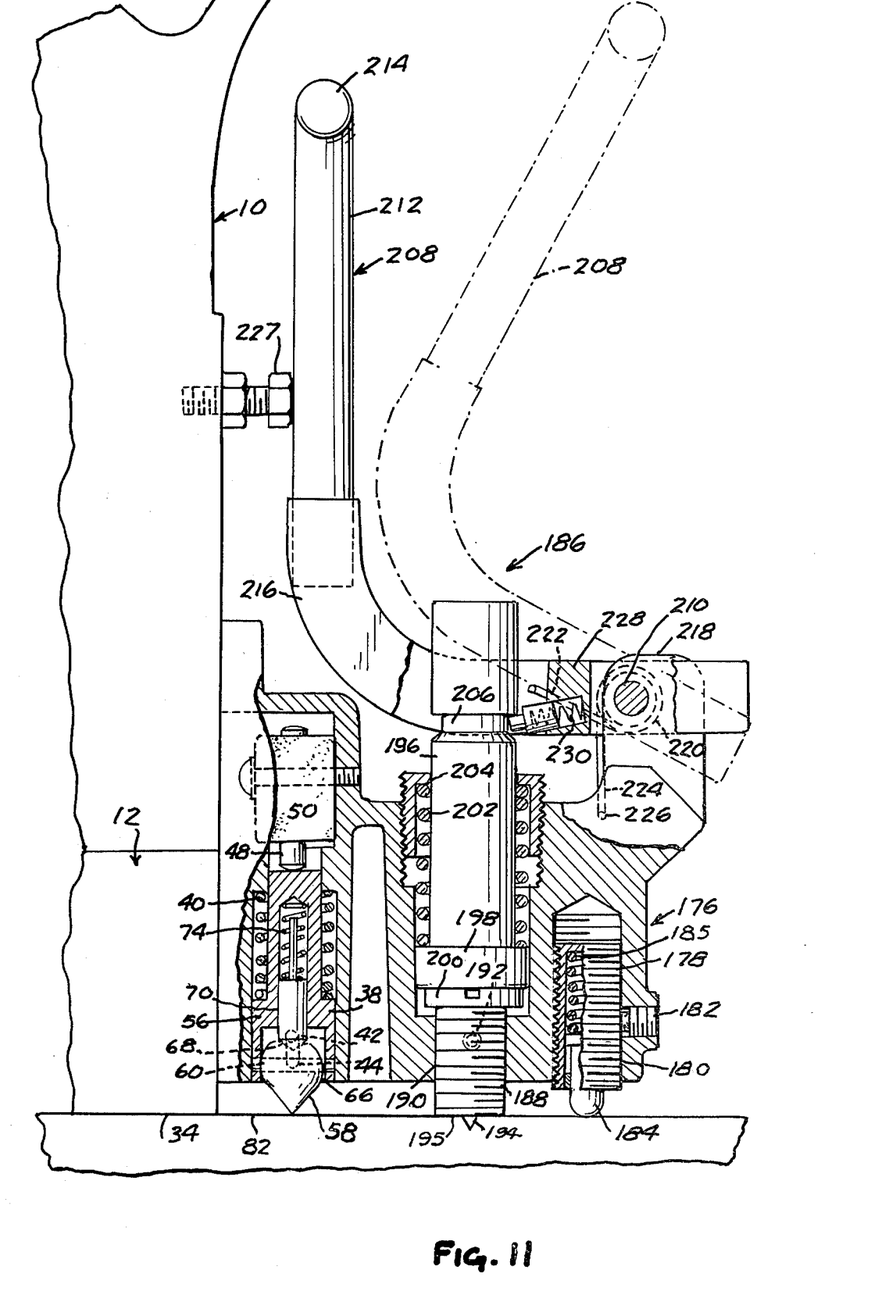
FIG. 11 is a fragmentary side elevational view of a modified form of drill unit embodying the invention.
Figure 12:
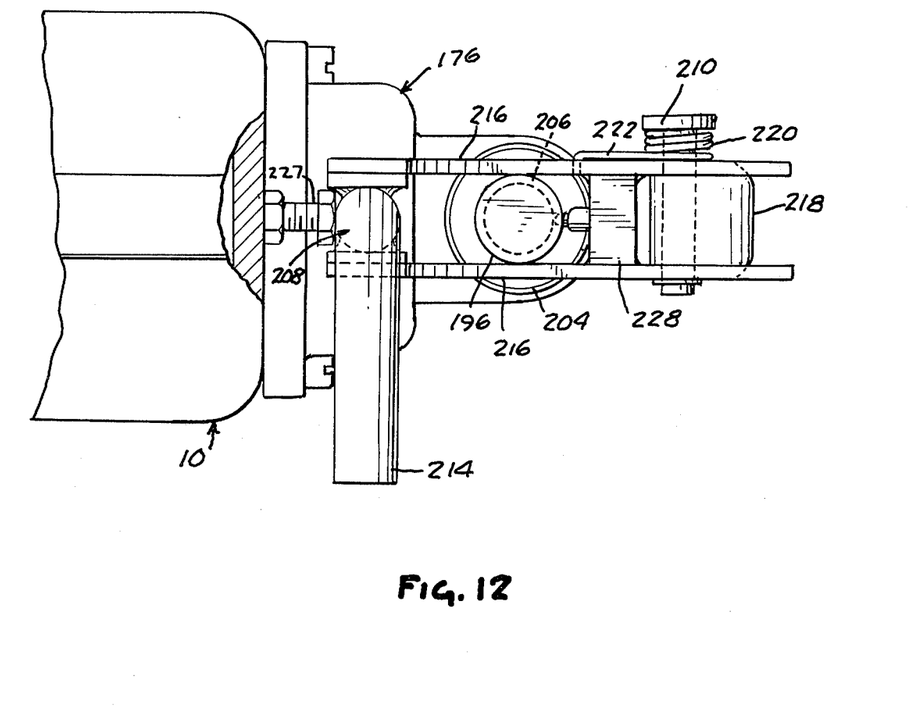
FIG. 12 is a top plan view of the arrangement shown in FIG. 11.

In the modified form of drill unit shown in FIGS. 11 and 12 there is mounted a housing 176 at the rear end of the drill unit body 10. Within housing 176 there is arranged the same safety switch mechanism shown in FIGS. 3, 4 and 5 having the pointed finger 58 at the lower end thereof for de-energizing the drill motor in response to lateral shifting or rocking of the drill unit on the work support surface 82. At the extreme rear end of housing a sleeve 178 is threaded vertically into the lower face thereof as at 180 and locked in adjusted position by a set screw 182. A plunger 184 within sleeve 178 is biased downwardly by a spring 185 so that the lower rounded end of the plunger normally projects downwardly below the plane of the bottom face 34 of magnet base 12 so as to support the drill unit in a forwardly tilted position about the straight front edge of base 12. In this position the unit can be easily slid or glided over the workpiece support surface 82 to any desired location with pointed end 64 of finger 58 spaced slightly above surface 82.

Intermediate stud 178 and the safety switch assembly there is mounted on housing 176 a punch assembly 186. This punch assembly comprises a punch 188 threaded into the housing as at 190 for vertical adjustment. Punch 188 is vertically adjusted and locked in place by a set screw 192 so that its lower pointed end 194 extends below the plane of the bottom face 34 of base 12 and the flat shoulder 195 is coplanar with the bottom face 34 of magnet base 12. Above punch 188 an impactor plunger 196 is arranged for vertical sliding movement within housing 176. Plunger 196 has an enlarged head 198 at its lower end which is adapted to abut against the head 200 at the upper end of punch 188. Plunger 196 is biased downwardly by a compression spring 202 which extends between head 198 and the underside of a spring retainer 204 threaded into housing 176. The upper end portion of impactor plunger 198 extends upwardly through retainer 204 and is formed with an annular groove 206.

A handle 208 is pivotally mounted on housing 176 as by a pin 210. Handle 208 comprises a rod 212 bent laterally at its upper end as at 214 and welded or otherwise secured at its lower end between two pair of rearwardly extending curved straps 216. At their rear ends straps 216 straddle a boss 218 at the upper rear end of housing 176. Pivot pin 210 extends through straps 216 and boss 218 as shown in FIG. 12. Torsion spring 220 encircles pin 210 and has one leg 222 secured to one of the straps 216 and its other leg 224 secured to housing 176 as at 226. Spring 220 biases handle 208 counterclockwise so as to normally engage a stop screw 227. A block 228 is fixedly mounted between straps 216 at a location intermediate impactor plunger 196 and pin 210. Within block 228 there is mounted a spring biased plunger 230 the end of which normally engages within annular groove 206. The axis of plunger 230 preferably extends along a radial line through the axis of pin 210. The upper end of impactor plunger 196 projects upwardly between and above straps 216 so that it can be struck with a hammer if desired.

In use the modified drill unit shown in FIGS. 11 and 12 is positioned on the work support surface 82 of the workpiece with the pilot pin 172 of the cutter located directly above the axis of the hole to be formed therein. The spring biased plunger 184 supports the drill unit in a forwardly tilted position. The electromagnet base 12 is then energized. The magnet is of sufficient strength to compress spring 185 and thereby cause the pointed end 194 of the punch to contact support surface 82. Thereafter, handle 208 is pivoted clockwise from the position shown in solid lines in FIG. 11 to the broken line position. As the handle is pivoted clockwise the end of plunger 230 engaged within groove 206 likewise pivots upwardly to lift impactor plunger 196 and, thus, compress spring 202. However, when handle 208 approaches the position illustrated in broken lines in FIG. 11 the end of plunger 230 will have become disengaged from within groove 206 and impactor plunger 196 will then be driven downwardly with a relatively high velocity by the compressed spring 202. Thus, the head 198 of impactor plunger 196 will strike the head 200 of punch 188 with a considerable force. The force of this impact together with the pull of the electromagnet and the mass of the drill unit will cause the pointed end 194 of the punch 188 to become embedded in the work support surface 82 of the workpiece. When handle 208 is pivoted back to the solid line position, plunger 230 will retract and then spring back into engagement with groove 206. If necessary, handle 208 can be actuated in this manner several times to insure that the flat shoulder 195 of the punch is in coplanar engagement with support surface 82 or the enlarged head of plunger 196 can be struck with a hammer to insure full penetration of the punch.

I claim:

1. In combination a drill unit for cutting holes in a metal workpiece, said drill unit having an electrical motor for rotating the hole cutting tool on the unit and an electromagnet base having a generally flat bottom face for magnetically adherring the drill unit to a support surface on the workpiece when the electromagnet is energized, a switch actuator on the drill unit having a movable finger adapted to frictionally engage the support surface, said movable finger assuming a first position when the electromagnet is energized to magnetically adhere the drill unit to said support surface and being movable to a second position in response to relative movement between the energized magnet and the work support surface, and switch means responsive to movement of said movable finger to said second position for de-energizing said motor.

2. The combination set forth in claim 1 wherein said movable finger is spaced outwardly from said base.

3. The combination set forth in claim 1 wherein the cutting tool is offset forwardly from said base and said movable finger is offset rearwardly from said base.

4. The combination set forth in claim 1 wherein said movable finger is resiliently biased to assume said first position.

5. The combination set forth in claim 1 wherein the portion of the movable finger engageable with the support surface is pointed.

6. The combination set forth in claim 1 wherein the movable finger is biased to move in a direction generally perpendicular to the bottom face of the base of the magnet in response to lifting of the magnet from said support surface.

7. The combination set forth in claim 1 wherein the movable finger is adapted to pivot about an axis generally parallel to the bottom face of the magnet in response to movement of the magnet laterally on said support surface.

8. The combination set forth in claim 1 wherein said movable finger is adapted to move in a path generally perpendicular to the bottom face of the magnet in response to lifting of the magnet from said support surface and is adapted to pivot about an axis generally parallel to said bottom face of the magnet in response to movement of the magnet laterally on said support surface.

9. The combination set forth in claim 8 wherein said switch actuator includes a plunger mounted for movement in a direction generally perpendicular to the plane of the bottom face of the magnet, said finger being pivotally connected to said plunger.

10. The combination set forth in claim 8 wherein said switch actuator includes a member adapted to shift axially to de-energize the motor in response to movement of said movable finger to said second position.

11. The combination set forth in claim 1 wherein said switch actuator includes a plunger mounted on the drill unit for axial movement in a vertical path generally perpendicular to the plane of the bottom face of the magnet, means resiliently biasing said plunger axially in one direction, said movable finger being displaceable in a direction perpendicular to the plane of said bottom face and being connected with said plunger for pivotal movement about an axis perpendicular to the axis of the plunger, said plunger being adapted to actuate said switch means to de-energize the motor in response to bodily displacement or pivotal movement of the movable finger.

12. The combination set forth in claim 10 wherein the plunger is biased axially downwardly.

13. The combination set forth in claim 12 wherein the movable finger is pivotally mounted on said plunger for axial movement therewith and the plunger is adapted to actuate the switch means to de-energize the motor in response to axial movement in a downward direction.

14. The combination set forth in claim 11 wherein the movable finger has a pointed lower end adapted to frictionally engage said support surface.

15. The combination set forth in claim 14 including means yieldably biasing said movable finger about its pivot axis to assume a position wherein a plane containing said pivot axis and said pointed end extends vertically.

16. The combination set forth in claim 14 wherein said pivot axis extends horizontally between upper and lower ends of the movable finger and including spring means acting between the plunger and the upper end of the movable finger to resiliently retain the finger in an upright position with its pointed end disposed directly below said pivot axis.

17. The combination set forth in claim 15 wherein said spring means includes a detent on said plunger biased downwardly into engagement with the upper end of the movable finger.

18. The combination set forth in claim 17 including means limiting the extent of pivotal movement of the finger to prevent disengagement of the detent and the upper end of the movable finger.

19. The combination set forth in claim 13 wherein the lower end of the plunger is formed with a recess of circular cross section, the upper end of said movable finger being spherically shaped and having a relatively close fit with said circular recess.

20. The combination set forth in claim 1 including a manually operable switch for energizing and de-energizing said motor, said switch means being in series circuit with said manually operable switch so that the motor cannot be energized unless said finger is in said first position.

21. A drill unit for cutting holes in a metal workpiece, said drill unit having an electromagnet base with a generally flat bottom face for magnetically adherring the drill unit to a support surface on the metal workpiece when the electromagnet is energized, said drill unit having a pointed punch thereon adapted to be driven downwardly against and embedded into said workpiece support surface to resist lateral movement of the drill unit on the support surface, and means for driving said punch downwardly comprising impactor means including a vertically shiftable impactor operably connected with said punch to drive the punch downwardly in response to downward movement of the impactor, spring means acting on and biasing said impactor in a downward direction, a manually shiftable member on said drill unit engageable with said impactor means for raising the impactor and thereby increasing the bias of said spring means, and means for abruptly disengaging said manually shiftable member from said impactor means when the impactor is in a raised position to cause the impactor to move downwardly at a high velocity under the biasing force of said spring means and thereby impact the punch downwardly and against and embed it into the workpiece support surface.

22. A drill unit as set forth in claim 21 wherein the drill unit includes a rotary driven, vertically shiftable spindle adapted to support a hole cutter at its lower end, said manually shiftable member being operably connected to said spindle for raising and lowering the spindle.

23. A drill unit as set forth in claim 22 wherein the spindle is spaced forwardly from the front end of the base and the punch is spaced rearwardly from the rear end of the base.

24. A drill unit as set forth in claim 23 wherein said manually shiftable member is located between said spindle and said punch and said impactor means includes lever means operably interconnecting the impactor and the manually shiftable member.

25. A drill unit as set forth in claim 21 including a first abutment on said manually shiftable member, a second abutment on said impactor means and engageable with the first abutment to raise the impactor and increase the bias of said spring means when the manually shiftable member is displaced in one direction, said abutments being adapted to abruptly disengage when the manually shiftable member is displaced in said one location beyond a predetermined position.

26. A drill unit as set forth in claim 25 wherein the second abutment is mounted at one end of a lever means extending between the manually shiftable member and said impactor, the opposite end of said lever means being connected with the impactor to reciprocate the impactor vertically.

27. A drill unit as set forth in claim 25 including means biasing one of said abutments to a position to interengage with the other abutment when the manually shiftable member is displaced in said one direction, said one abutment being displaceable against the force of said biasing means to bypass the other abutment when the manually shiftable member is displaced in the opposite direction after the abutments abruptly disengage.

28. A drill unit as set forth in claim 27 wherein said punch is fixedly mounted on the lower end of said impactor.

29. A drill unit as set forth in claim 28 wherein the upper end of said punch is exposed and unobstructed so as to be capable of being manually struck downwardly with a hammer.

30. A drill unit as set forth in claim 27 wherein said punch is fixedly mounted on said drill unit and adapted to be struck downwardly by the lower end of said impactor.

31. A drill unit as set forth in claim 25 wherein said spring means comprises a compression spring and said abutments are positioned to interengage and compress said spring when the impactor is displaced upwardly to a predetermined position.

32. A drill unit as set forth in claim 25 wherein said manually shiftable member comprises a hand lever pivotally mounted on said drill unit.

33. A drill unit as set forth in claim 32 wherein the pivot axis of said lever is laterally offset from the vertical axis of the impactor, said first abutment being fixed to said lever to pivot therewith.

34. A drill unit as called for in claim 21 wherein the punch is fixedly mounted on the drill unit with its pointed lower end projecting below the plane of the bottom face of the base and including a spring biased support member on the drill unit normally supporting it in a position tilted forwardly about the front edge of the base with the pointed lower end of the punch spaced above the work support surface, said electromagnet being of sufficient strength when energized to overcome the spring bias on the support member and rock the drill rearwardly about the front edge of the base to engage the pointed end of the punch with the workpiece support surface.

35. A drill unit as set forth in claim 34 wherein the punch has a flat shoulder adjacent the lower end thereof coplanar with the flat bottom face of the base for limiting the depth of penetration of the pointed end of the punch.

36. A drill unit as set forth in claim 34 including a drill motor on said drill unit for driving a hole cutting tool and a finger movably mounted on said drill unit and biased downwardly to frictionally engage the work support surface when the electromagnet is energized, said finger being movable in response to rocking or lateral movement of the drill unit on the support surface to de-energize the drill motor, said spring biased support member supporting the drill unit in said forwardly inclined position when the electromagnet is de-energized so that said finger is out of frictional contact with the workpiece support surface.

37. In a drill unit for cutting holes in a metal workpiece, said drill unit being of the type having an electromagnet base provided with a generally flat bottom face for magnetically adherring the drill unit to a support surface on the workpiece and also having a vertically shiftable drill spindle spaced forwardly of the front end of said base, that improvement which comprises a bracket projecting rearwardly from the rear end of said base, a fixed stop projecting downwardly from the rear end portion of said bracket, said stop having a generally flat face at its lower end coplanar with the bottom face of said base, and a vertically disposed punch fixed on said bracket having an upper end and a pointed lower end, said pointed end extending downwardly below the lower end face of said stop, the upper end of said punch being free and unobstructed so as to be capable of being manually struck downwardly with a hammer.

38. The improvement called for in claim 37 wherein said punch is threaded on said bracket for vertical adjustment to vary the extent to which the pointed end of the punch extends below the lower end face of said stop.

39. The improvement called for in claim 38 wherein said stop comprises a sleeve, said punch extending downwardly through said sleeve.

40. The improvement called for in claim 39 wherein the upper end of the punch projects above the upper end of said sleeve.

41. The improvement called for in claim 40 wherein the punch is threaded in said sleeve for vertical adjustment to vary the extent to which the pointed end of the punch extends downwardly below the lower end face of the sleeve.

42. In a drill unit for cutting holes in a metal workpiece, said drill unit being of the type having an electromagnet base provided with a generally flat bottom face for magnetically adherring the drill unit to a support surface on the workpiece and also having a vertically shiftable drill spindle spaced forwardly of the front end of said base, that improvement which comprises a bracket fixedly mounted on said drill unit and projecting laterally from said base, and a vertically disposed punch fixed on said bracket having an upper end and a pointed lower end, said pointed end extending downwardly below the plane of said bottom face, the upper end of said punch being free and unobstructed so as to be capable of being manually struck downwardly with a hammer while fixed on said bracket to drive the pointed end of the punch into the workpiece and thereby tilt the drill unit to a position wherein said bottom face of the base is in coplanar engagement with the support surface of the workpiece.

43. A drill unit for cutting holes in a metal workpiece, said drill unit having an electromagnet base with a generally flat bottom face for magnetically adherring the drill unit to a support surface on the metal workpiece when the electromagnet is energized, said drill unit having bracket means projecting laterally from said base and fixedly mounted thereon, a vertically disposed punch mounted on said bracket and having an upper end portion and a pointed lower end, said punch being slideable vertically on said bracket means from a position wherein the lower pointed end of the punch is disposed above the plane of said flat bottom face to a position wherein the pointed end of the punch is disposed below the plane of said flat bottom face, said upper end portion being adapted to be struck downwardly while mounted on said bracket to shift the punch downwardly on said bracket and thereby embed the pointed end of the punch into said work support surface to resist lateral movement of the drill unit on the support surface when the electromagnet is energized and means for retaining the punch in its downwardly driven position on said bracket embedded in said workpiece support surface.

* * * * *

UNITED STATES PATENT OFFICE
CERTIFICATE OF CORRECTION

PATENT NO. : 4,261,673
DATED : April 14, 1981
INVENTOR(S) : Everett D. Hougen

It is certified that error appears in the above-identified patent and that said Letters Patent are hereby corrected as shown below:

Column 9, Line 13   Cancel "location" and insert in place thereof -- direction --

Signed and Sealed this

Fifteenth Day of September 1981

[SEAL]

Attest:

Attesting Officer

GERALD J. MOSSINGHOFF

Commissioner of Patents and Trademarks